(12) United States Patent
Turk

(10) Patent No.: US 9,872,444 B2
(45) Date of Patent: Jan. 23, 2018

(54) DRIP EMITTER

(71) Applicant: Rain Bird Corporation, Azusa, CA (US)

(72) Inventor: Michael F. Turk, Porter Ranch, CA (US)

(73) Assignee: Rain Bird Corporation, Azusa, CA (US)

( * ) Notice: Subject to any disclaimer, the term of this patent is extended or adjusted under 35 U.S.C. 154(b) by 201 days.

(21) Appl. No.: 13/839,726

(22) Filed: Mar. 15, 2013

(65) Prior Publication Data
US 2014/0263758 A1    Sep. 18, 2014

(51) Int. Cl.
*B05B 15/00*    (2006.01)
*A01G 25/02*    (2006.01)

(52) U.S. Cl.
CPC .................................. *A01G 25/023* (2013.01)

(58) Field of Classification Search
CPC .............................. A01G 25/023; A01G 25/06
USPC .................................................. 239/542, 547
See application file for complete search history.

(56) References Cited

U.S. PATENT DOCUMENTS

| | | |
|---|---|---|
| 2,174,515 A | 10/1939 | Hughes |
| 2,449,731 A | 9/1948 | Therrien |
| 2,508,403 A | 5/1950 | Knauss |
| 2,625,429 A | 1/1953 | Coles |
| 2,639,194 A | 5/1953 | Wahlin |
| 2,683,061 A | 7/1954 | Tuttle, Jr. |
| 2,794,321 A | 6/1957 | Warner |
| 2,873,030 A | 2/1959 | Ashton |
| 2,970,923 A | 2/1961 | Sparman |
| 3,155,612 A | 11/1964 | Weber |
| 3,182,916 A | 5/1965 | Schulz |
| 3,199,901 A | 8/1965 | Jeppsson |

(Continued)

FOREIGN PATENT DOCUMENTS

| | | |
|---|---|---|
| AU | 2004208646 | 3/2006 |
| CA | 1053726 | 5/1979 |

(Continued)

OTHER PUBLICATIONS

Rain Bird Corporation, Agriculture Irrigation Equipment 1981 Catalog, 1979, 3 pp.

(Continued)

*Primary Examiner* — Davis Hwu
(74) *Attorney, Agent, or Firm* — Fitch, Even, Tabin & Flannery, LLP

(57) ABSTRACT

A drip emitter is described herein that is advantageously configured to allow large grit to pass through the drip emitter when in use. The drip emitter includes a housing containing a flow path extending between a water inlet and a water outlet, a pressure-reducing segment, such as a tortuous path, of the flow path downstream of the inlet and upstream of the outlet, and a dynamic pressure regulator downstream of the water inlet and upstream of the pressure-reducing segment of the flow path. The dynamic pressure regulator is configured such that a decrease in pressure in the pressure-reducing segment of the flow path causes the dynamic pressure regulator to adjust to maintain a generally constant rate of flow through the water inlet as compared to the rate of flow when there is no decrease in pressure in the pressure-reducing segment of the flow path.

20 Claims, 7 Drawing Sheets

(56) References Cited

U.S. PATENT DOCUMENTS

| | | |
|---|---|---|
| 3,302,450 A | 2/1967 | Wakar |
| 3,323,550 A | 6/1967 | Lee |
| 3,361,359 A | 1/1968 | Chapin |
| 3,420,064 A | 1/1969 | Blass et al. |
| 3,434,500 A | 3/1969 | Burrows |
| 3,467,142 A | 9/1969 | Boyle et al. |
| 3,586,291 A | 6/1971 | Malec |
| 3,672,571 A | 6/1972 | Goodricke |
| 3,693,888 A | 9/1972 | Rondas et al. |
| 3,697,002 A | 10/1972 | Parkison |
| 3,698,195 A | 10/1972 | Chapin |
| 3,719,327 A | 3/1973 | McMahan |
| 3,729,142 A | 4/1973 | Rangel-Garza et al. |
| 3,753,527 A | 8/1973 | Galbraith et al. |
| 3,777,980 A | 12/1973 | Allport |
| 3,777,987 A | 12/1973 | Allport |
| 3,779,468 A | 12/1973 | Spencer |
| 3,780,946 A | 12/1973 | Smith et al. |
| 3,791,587 A | 2/1974 | Drori |
| 3,804,334 A | 4/1974 | Curry |
| 3,807,430 A | 4/1974 | Keller |
| 3,814,377 A | 6/1974 | Todd |
| 3,815,636 A | 6/1974 | Menzel |
| RE28,095 E | 7/1974 | Chapin |
| 3,851,896 A | 12/1974 | Olson |
| 3,856,333 A | 12/1974 | Cox |
| 3,863,845 A | 2/1975 | Bumpstead |
| 3,870,236 A | 3/1975 | Sahagun-Barragan |
| 3,873,030 A | 3/1975 | Barragan |
| 3,874,598 A | 4/1975 | Havens |
| 3,882,892 A | 5/1975 | Menzel |
| 3,885,743 A | 5/1975 | Wake |
| 3,895,085 A | 7/1975 | Suzuki et al. |
| 3,896,999 A | 7/1975 | Barragan |
| 3,903,929 A | 9/1975 | Mock |
| 3,940,066 A | 2/1976 | Hunter |
| 3,948,285 A | 4/1976 | Flynn |
| 3,954,223 A | 5/1976 | Wichman et al. |
| 3,970,251 A | 7/1976 | Harmony |
| 3,973,732 A | 8/1976 | Diggs |
| 3,981,452 A | 9/1976 | Eckstein |
| 3,993,248 A | 11/1976 | Harmony |
| 3,995,436 A | 12/1976 | Diggs |
| 3,998,244 A | 12/1976 | Bentley |
| 3,998,391 A | 12/1976 | Lemelshtrich |
| 3,998,427 A | 12/1976 | Bentley |
| 4,008,853 A | 2/1977 | Tregillus |
| 4,022,384 A | 5/1977 | Hoyle |
| 4,036,435 A | 7/1977 | Pecaro |
| 4,037,791 A | 7/1977 | Mullett |
| 4,047,995 A | 9/1977 | Leal-Diaz |
| 4,058,257 A | 11/1977 | Spencer |
| 4,059,228 A * | 11/1977 | Werner ............... A01G 25/023 239/106 |
| 4,077,570 A | 3/1978 | Harmony |
| 4,077,571 A | 3/1978 | Harmony |
| 4,084,749 A | 4/1978 | Drori |
| 4,092,002 A | 5/1978 | Grosse |
| 4,095,750 A | 6/1978 | Gilead |
| 4,105,162 A | 8/1978 | Drori |
| 4,121,771 A | 10/1978 | Hendrickson |
| 4,122,590 A | 10/1978 | Spencer |
| 4,143,820 A | 3/1979 | BrightSr |
| 4,160,323 A | 7/1979 | Tracy |
| 4,161,291 A | 7/1979 | Bentley |
| 4,177,946 A | 12/1979 | Sahagun-Barragan |
| 4,177,947 A | 12/1979 | Menzel |
| 4,196,853 A | 4/1980 | Delmer |
| 4,209,133 A | 6/1980 | Mehoudar |
| 4,210,287 A | 7/1980 | Mehoudar |
| 4,223,838 A | 9/1980 | Maria-Vittorio-Torrisi |
| 4,225,307 A | 9/1980 | Magera |
| 4,226,368 A | 10/1980 | Hunter |
| 4,235,380 A | 11/1980 | Delmer |
| 4,247,051 A | 1/1981 | Allport |
| 4,250,915 A | 2/1981 | Rikuta |
| 4,273,286 A | 6/1981 | Menzel |
| 4,274,597 A | 6/1981 | Dobos |
| 4,281,798 A | 8/1981 | Lemelstrich |
| 4,307,841 A | 12/1981 | Mehoudar |
| 4,331,293 A | 5/1982 | Rangel-Garza |
| 4,344,576 A | 8/1982 | Smith |
| 4,354,639 A | 10/1982 | Delmer |
| 4,366,926 A | 1/1983 | Mehoudar |
| 4,369,923 A | 1/1983 | Bron |
| 4,384,680 A | 5/1983 | Mehoudar |
| 4,385,727 A | 5/1983 | Spencer |
| 4,385,757 A | 5/1983 | Muller |
| 4,392,616 A | 7/1983 | Olson |
| 4,413,786 A | 11/1983 | Mehoudar |
| 4,413,787 A | 11/1983 | Gilead |
| 4,424,936 A | 1/1984 | Marc |
| 4,430,020 A | 2/1984 | Robbins |
| 4,460,129 A | 7/1984 | Olson |
| 4,473,191 A | 9/1984 | Chapin |
| 4,473,525 A | 9/1984 | Drori |
| 4,502,631 A | 3/1985 | Christen |
| 4,508,140 A | 4/1985 | Harrison |
| 4,513,777 A | 4/1985 | Wright |
| 4,519,546 A | 5/1985 | Gorney |
| 4,522,339 A | 6/1985 | Costa |
| 4,533,083 A | 8/1985 | Tucker |
| 4,534,515 A | 8/1985 | Chapin |
| 4,545,784 A | 10/1985 | Sanderson |
| 4,572,756 A | 2/1986 | Chapin |
| 4,573,640 A | 3/1986 | Mehoudar |
| 4,593,857 A | 6/1986 | Raz |
| 4,613,080 A | 9/1986 | Benson |
| 4,626,130 A | 12/1986 | Chapin |
| 4,627,903 A | 12/1986 | Chapman |
| 4,642,152 A | 2/1987 | Chapin |
| 4,653,695 A | 3/1987 | Eckstein |
| 4,687,143 A | 8/1987 | Gorney |
| 4,702,787 A | 10/1987 | Ruskin |
| 4,718,608 A | 1/1988 | Mehoudar |
| 4,722,481 A | 2/1988 | Lemkin |
| 4,722,759 A | 2/1988 | Roberts |
| 4,726,520 A | 2/1988 | Brown |
| 4,726,527 A | 2/1988 | Mendenhall |
| 4,728,042 A | 3/1988 | Gorney |
| 4,735,363 A | 4/1988 | Shfaram |
| 4,749,130 A | 6/1988 | Utzinger |
| 4,753,394 A | 6/1988 | Goodman |
| 4,756,339 A | 7/1988 | Buluschek |
| 4,765,541 A | 8/1988 | Mangels |
| 4,775,046 A | 10/1988 | Gramarossa |
| 4,789,005 A | 12/1988 | Griffiths |
| 4,796,660 A | 1/1989 | Bron |
| 4,807,668 A | 2/1989 | Roberts |
| 4,817,875 A | 4/1989 | Karmeli |
| 4,824,019 A | 4/1989 | Lew |
| 4,824,025 A | 4/1989 | Miller |
| 4,850,531 A | 7/1989 | Littleton |
| 4,856,552 A | 8/1989 | Hiemstra |
| 4,859,264 A | 8/1989 | Buluschek |
| 4,874,132 A | 10/1989 | Gilead |
| 4,880,167 A | 11/1989 | Langa et al. |
| 4,900,437 A | 2/1990 | Savall |
| 4,909,411 A | 3/1990 | Uchida |
| 4,948,295 A | 8/1990 | Pramsoler |
| 4,984,739 A | 1/1991 | Allport |
| 5,022,940 A | 6/1991 | Mehoudar |
| 5,031,837 A | 7/1991 | Hanish |
| 5,040,770 A | 8/1991 | Rajster |
| 5,052,625 A | 10/1991 | Ruskin |
| 5,096,206 A | 3/1992 | Andre |
| 5,111,995 A | 5/1992 | Dumitrascu |
| 5,111,996 A | 5/1992 | Eckstein |
| 5,116,414 A | 5/1992 | Burton |
| 5,118,042 A | 6/1992 | Delmer et al. |
| 5,122,044 A | 6/1992 | Mehoudar |
| 5,123,984 A | 6/1992 | Allport |
| 5,137,216 A | 8/1992 | Hanish |
| 5,141,360 A | 8/1992 | Zeman |

(56) References Cited

U.S. PATENT DOCUMENTS

| | | |
|---|---|---|
| 5,163,622 A | 11/1992 | Cohen |
| 5,181,952 A | 1/1993 | Burton |
| 5,183,208 A | 2/1993 | Cohen |
| 5,192,027 A | 3/1993 | Delmer |
| 5,200,132 A | 4/1993 | Shfaram |
| 5,203,503 A | 4/1993 | Cohen |
| 5,207,386 A | 5/1993 | Mehoudar |
| 5,232,159 A | 8/1993 | Abbate, Sr. |
| 5,232,160 A | 8/1993 | Hendrickson |
| 5,236,130 A | 8/1993 | Hadar |
| 5,246,171 A | 9/1993 | Roberts |
| 5,252,162 A | 10/1993 | Delmer |
| 5,253,807 A | 10/1993 | Newbegin |
| 5,271,786 A | 12/1993 | Gorney |
| 5,279,462 A | 1/1994 | Mehoudar |
| 5,282,578 A | 2/1994 | DeFrank |
| 5,282,916 A | 2/1994 | Bloom |
| 5,283,916 A | 2/1994 | Haro |
| 5,294,058 A | 3/1994 | Einav |
| 5,310,438 A | 5/1994 | Ruskin |
| 5,316,220 A | 5/1994 | Dinur |
| 5,318,657 A | 6/1994 | Roberts |
| 5,324,371 A | 6/1994 | Mehoudar |
| 5,324,379 A | 6/1994 | Eckstein |
| 5,327,941 A | 7/1994 | Bitsakis |
| 5,330,107 A | 7/1994 | Karathanos |
| 5,332,160 A | 7/1994 | Ruskin |
| 5,333,793 A | 8/1994 | DeFrank |
| 5,337,597 A | 8/1994 | Peake |
| 5,364,032 A | 11/1994 | DeFrank |
| 5,400,973 A | 3/1995 | Cohen |
| 5,413,282 A | 5/1995 | Boswell |
| 5,441,203 A | 8/1995 | Swan |
| 5,442,001 A | 8/1995 | Jones |
| 5,443,212 A | 8/1995 | Dinur |
| 5,449,250 A | 9/1995 | Burton |
| 5,522,551 A | 6/1996 | DeFrank |
| 5,535,778 A | 7/1996 | Zakai |
| 5,584,952 A | 12/1996 | Rubenstein |
| 5,586,727 A | 12/1996 | Shekalim |
| 5,591,293 A | 1/1997 | Miller |
| 5,609,303 A | 3/1997 | Cohen |
| 5,615,833 A | 4/1997 | Robillard et al. |
| 5,615,838 A | 4/1997 | Eckstein et al. |
| 5,620,143 A | 4/1997 | Delmer |
| 5,628,462 A | 5/1997 | Miller |
| 5,634,594 A | 6/1997 | Cohen |
| 5,636,797 A | 6/1997 | Cohen |
| 5,673,852 A | 10/1997 | Roberts |
| 5,676,897 A | 10/1997 | Dermitzakis |
| 5,695,127 A | 12/1997 | Delmer |
| 5,722,601 A | 3/1998 | DeFrank |
| 5,732,887 A | 3/1998 | Roberts |
| 5,744,423 A | 4/1998 | Voris |
| 5,744,779 A | 4/1998 | Buluschek |
| 5,785,785 A | 7/1998 | Delmer |
| 5,820,028 A | 10/1998 | Dinur |
| 5,820,029 A | 10/1998 | Marans |
| 5,829,685 A | 11/1998 | Cohen |
| 5,829,686 A | 11/1998 | Cohen |
| 5,855,324 A | 1/1999 | DeFrank et al. |
| 5,865,377 A | 2/1999 | DeFrank |
| 5,871,325 A * | 2/1999 | Schmidt ............ H05K 13/0061 198/817 |
| 5,875,815 A | 3/1999 | Ungerecht |
| 5,898,019 A | 4/1999 | VanVoris |
| 5,944,260 A | 8/1999 | Wang |
| 5,957,391 A | 9/1999 | DeFrank et al. |
| 5,972,375 A | 10/1999 | Truter |
| 6,015,102 A | 1/2000 | Daigle |
| 6,026,850 A | 2/2000 | Newton |
| 6,027,048 A | 2/2000 | Mehoudar |
| 6,039,270 A | 3/2000 | Dermitzakis |
| 6,062,245 A | 5/2000 | Berglind |
| 6,095,185 A | 8/2000 | Rosenberg |
| 6,109,296 A | 8/2000 | Austin |
| 6,116,523 A | 9/2000 | Cabahug |
| 6,120,634 A | 9/2000 | Harrold |
| 6,179,949 B1 | 1/2001 | Buluschek |
| 6,180,162 B1 | 1/2001 | Shigeru |
| 6,206,305 B1 | 3/2001 | Mehoudar |
| 6,213,408 B1 | 4/2001 | Shekalim |
| 6,238,081 B1 | 5/2001 | Sand |
| 6,250,571 B1 | 6/2001 | Cohen |
| 6,280,554 B1 | 8/2001 | Lambert et al. |
| 6,302,338 B1 | 10/2001 | Cohen |
| 6,308,902 B1 | 10/2001 | Huntley |
| 6,334,958 B1 | 1/2002 | Ruskin |
| 6,343,616 B1 | 2/2002 | Houtchens |
| 6,371,390 B1 | 4/2002 | Cohen |
| 6,382,530 B1 | 5/2002 | Perkins |
| 6,394,412 B2 | 5/2002 | Zakai et al. |
| 6,403,013 B1 | 6/2002 | Man |
| 6,449,872 B1 | 9/2002 | Olkku |
| 6,460,786 B1 | 10/2002 | Roberts |
| 6,461,468 B1 | 10/2002 | Cohen |
| 6,461,486 B2 | 10/2002 | Lorincz et al. |
| 6,464,152 B1 | 10/2002 | Bolinis |
| 6,499,687 B2 | 12/2002 | Bryant |
| 6,499,872 B2 | 12/2002 | Sand |
| 6,513,734 B2 | 2/2003 | Bertolotti |
| 6,543,509 B1 | 4/2003 | Harrold |
| 6,557,819 B2 | 5/2003 | Austin |
| 6,561,443 B2 | 5/2003 | Delmer |
| 6,568,607 B2 | 5/2003 | Boswell et al. |
| 6,581,262 B1 | 6/2003 | Myers |
| 6,581,854 B2 | 6/2003 | Eckstein et al. |
| 6,581,902 B2 | 6/2003 | Michau |
| 6,620,278 B1 | 9/2003 | Harrold |
| 6,622,427 B2 | 9/2003 | Breitner |
| 6,622,946 B2 | 9/2003 | Held |
| 6,736,337 B2 | 5/2004 | Vildibill et al. |
| 6,750,760 B2 | 6/2004 | Albritton |
| 6,817,548 B2 | 11/2004 | Krauth |
| 6,821,928 B2 | 11/2004 | Ruskin |
| 6,827,298 B2 | 12/2004 | Sacks |
| 6,830,203 B2 | 12/2004 | Neyestani |
| 6,875,491 B2 | 4/2005 | Miyamoto |
| 6,886,761 B2 | 5/2005 | Cohen |
| 6,894,250 B2 | 5/2005 | Kertscher |
| 6,896,758 B1 | 5/2005 | Giuffre |
| 6,933,337 B2 | 8/2005 | Lang |
| 6,936,126 B2 | 8/2005 | DeFrank |
| 6,945,476 B2 | 9/2005 | Giuffre |
| 7,048,010 B2 | 5/2006 | Golan |
| 7,108,205 B1 | 9/2006 | Hashimshony |
| 7,175,113 B2 | 2/2007 | Cohen |
| 7,241,825 B2 | 7/2007 | Koga |
| 7,270,280 B2 | 9/2007 | Belford |
| 7,300,004 B2 | 11/2007 | Sinden |
| 7,363,938 B1 | 4/2008 | Newton |
| 7,392,614 B2 | 7/2008 | Kruer |
| 7,410,108 B2 | 8/2008 | Rabinowitz |
| 7,445,021 B2 | 11/2008 | Newton |
| 7,445,168 B2 | 11/2008 | Ruskin |
| 7,455,094 B2 | 11/2008 | Lee |
| 7,530,382 B2 | 5/2009 | Kertscher et al. |
| 7,648,085 B2 | 1/2010 | Mavrakis |
| 7,681,805 B2 | 3/2010 | Belford |
| 7,681,810 B2 | 3/2010 | Keren |
| 7,695,587 B2 | 4/2010 | Kertscher |
| 7,735,758 B2 | 6/2010 | Cohen |
| 7,775,237 B2 | 8/2010 | Keren |
| 7,802,592 B2 | 9/2010 | McCarty |
| 7,887,664 B1 | 2/2011 | Mata |
| 7,954,732 B2 | 6/2011 | Shekalim |
| 7,988,076 B2 | 8/2011 | Mamo |
| 8,002,496 B2 | 8/2011 | Giuffre |
| 8,079,385 B2 | 12/2011 | Hatton |
| 8,091,800 B2 | 1/2012 | Retter |
| 8,096,491 B2 | 1/2012 | Lutzki |
| 8,141,589 B2 | 3/2012 | Socolsky |
| 8,267,115 B2 | 9/2012 | Giuffre' |
| 8,286,667 B2 | 10/2012 | Ruskin |

(56) References Cited

U.S. PATENT DOCUMENTS

| | | |
|---|---|---|
| 8,302,887 B2 | 11/2012 | Park |
| 8,381,437 B2 | 2/2013 | Ciudaj |
| 8,439,282 B2 | 5/2013 | Allen |
| 8,454,786 B2 | 6/2013 | Guichard |
| 8,469,294 B2 | 6/2013 | Mata |
| 8,475,617 B2 | 7/2013 | Kertscher |
| 8,511,586 B2 | 8/2013 | Einav |
| 8,628,032 B2 | 1/2014 | Feith |
| 8,663,525 B2 | 3/2014 | Mamo |
| 8,689,484 B2 | 4/2014 | Ruskin |
| 8,714,205 B2 | 5/2014 | Loebinger |
| 8,870,098 B2 | 10/2014 | Lutzki |
| 8,882,004 B2 | 11/2014 | Gorney |
| 8,998,112 B2 | 4/2015 | Cohen |
| 8,998,113 B2 | 4/2015 | Keren |
| 9,022,059 B2 | 5/2015 | Cohen |
| 9,022,764 B2 | 5/2015 | Wisler |
| 9,027,856 B2 | 5/2015 | DeFrank |
| 9,192,108 B2 | 11/2015 | Kertscher |
| 9,258,950 B2 | 2/2016 | Kidachi |
| 9,485,923 B2 | 11/2016 | Ensworth |
| 2002/0070297 A1* | 6/2002 | Bolinis ............... A01G 25/023 239/542 |
| 2002/0074434 A1 | 6/2002 | Delmer |
| 2002/0088877 A1 | 7/2002 | Bertolotti |
| 2002/0104902 A1 | 8/2002 | Eckstein et al. |
| 2002/0104903 A1 | 8/2002 | Eckstein et al. |
| 2002/0113147 A1 | 8/2002 | Huntley |
| 2003/0029937 A1 | 2/2003 | Dermitzakis |
| 2003/0042335 A1 | 3/2003 | Krauth |
| 2003/0050372 A1 | 3/2003 | Stanhope |
| 2003/0057301 A1 | 3/2003 | Cohen |
| 2003/0089409 A1 | 5/2003 | Morimoto |
| 2003/0090369 A1 | 5/2003 | Albritton |
| 2003/0092808 A1 | 5/2003 | Stanhope |
| 2003/0140977 A1 | 7/2003 | Berton |
| 2003/0150940 A1 | 8/2003 | Vildibill |
| 2003/0226913 A1 | 12/2003 | Brunnengraeber et al. |
| 2004/0018263 A1 | 1/2004 | Hashimshony |
| 2004/0164185 A1 | 8/2004 | Giuffre |
| 2005/0029231 A1 | 2/2005 | Kertscher |
| 2005/0077396 A1 | 4/2005 | Rabinowitz |
| 2005/0103409 A1 | 5/2005 | Weber |
| 2005/0133613 A1 | 6/2005 | Mayer |
| 2005/0224607 A1 | 10/2005 | Dinur et al. |
| 2005/0258278 A1 | 11/2005 | Cohen |
| 2005/0258279 A1 | 11/2005 | Harrold |
| 2005/0279866 A1 | 12/2005 | Belford |
| 2005/0284966 A1 | 12/2005 | DeFrank |
| 2006/0032949 A1 | 2/2006 | Lo |
| 2006/0043219 A1 | 3/2006 | Raanan |
| 2006/0144965 A1 | 7/2006 | Keren |
| 2006/0163388 A1 | 7/2006 | Mari |
| 2006/0169805 A1 | 8/2006 | Dabir |
| 2006/0186228 A1 | 8/2006 | Belford et al. |
| 2006/0202381 A1 | 9/2006 | Bach et al. |
| 2006/0237561 A1 | 10/2006 | Park et al. |
| 2007/0095950 A1 | 5/2007 | Kim |
| 2007/0108318 A1 | 5/2007 | Mamo |
| 2007/0138323 A1 | 6/2007 | Lee |
| 2007/0187031 A1 | 8/2007 | Kertscher |
| 2007/0194149 A1* | 8/2007 | Mavrakis ............ A01G 25/023 239/542 |
| 2008/0041978 A1 | 2/2008 | Keren |
| 2008/0067266 A1 | 3/2008 | Cohen |
| 2008/0099584 A1 | 5/2008 | Raanan |
| 2008/0105768 A1 | 5/2008 | Kertscher |
| 2008/0237374 A1 | 10/2008 | Belford |
| 2008/0257991 A1 | 10/2008 | Einav et al. |
| 2009/0020634 A1 | 1/2009 | Schweitzer |
| 2009/0145985 A1 | 6/2009 | Mayer |
| 2009/0159726 A1 | 6/2009 | Thompson |
| 2009/0165879 A1 | 7/2009 | Socolsky |
| 2009/0173811 A1 | 7/2009 | Gorney et al. |
| 2009/0261183 A1 | 10/2009 | Mavrakis |
| 2009/0266919 A1 | 10/2009 | Mavrakis |
| 2009/0283613 A1 | 11/2009 | Barkai |
| 2009/0302127 A1 | 12/2009 | Lutzki |
| 2009/0314377 A1 | 12/2009 | Giuffre |
| 2010/0096478 A1 | 4/2010 | Mamo |
| 2010/0096479 A1 | 4/2010 | Mamo |
| 2010/0108785 A1 | 5/2010 | Lee |
| 2010/0126974 A1 | 5/2010 | Kertscher |
| 2010/0155508 A1 | 6/2010 | Keren |
| 2010/0163651 A1 | 7/2010 | Feith |
| 2010/0175408 A1 | 7/2010 | Korda |
| 2010/0219265 A1 | 9/2010 | Feld |
| 2010/0237170 A1 | 9/2010 | Rosenberg |
| 2010/0244315 A1* | 9/2010 | Mamo ............... B29C 45/1635 264/255 |
| 2010/0252126 A1 | 10/2010 | Roes |
| 2010/0282873 A1* | 11/2010 | Mattlin ............... A01G 25/023 239/542 |
| 2011/0186652 A1 | 8/2011 | Cohen |
| 2012/0012678 A1 | 1/2012 | Gregory |
| 2012/0012682 A1 | 1/2012 | Einav |
| 2012/0074345 A1 | 3/2012 | Hatton |
| 2012/0104648 A1 | 5/2012 | Yiflach |
| 2012/0267454 A1* | 10/2012 | Einav et al. ................ 239/542 |
| 2013/0181066 A1 | 7/2013 | Dermitzakis |
| 2013/0248616 A1 | 9/2013 | Ensworth |
| 2013/0341431 A1 | 12/2013 | Ensworth |
| 2014/0027539 A1 | 1/2014 | Kim |
| 2014/0034753 A1 | 2/2014 | Mavrakis |
| 2014/0110506 A1 | 4/2014 | Mavrakis |
| 2014/0263758 A1 | 9/2014 | Turk |
| 2015/0014446 A1 | 1/2015 | Cohen |
| 2015/0041563 A1 | 2/2015 | Ensworth |
| 2015/0090816 A1 | 4/2015 | Akritanakis |
| 2015/0107777 A1 | 4/2015 | Zakarian |
| 2015/0144717 A1 | 5/2015 | Turk |
| 2015/0181816 A1 | 7/2015 | Desarzens |
| 2015/0201568 A1 | 7/2015 | Einav |
| 2015/0296723 A1 | 10/2015 | Jain |
| 2015/0351333 A1 | 12/2015 | Eberle |
| 2016/0057947 A1 | 3/2016 | Ensworth |
| 2016/0075070 A1 | 3/2016 | Verelis |
| 2016/0088806 A1 | 3/2016 | Haub |
| 2016/0198643 A1 | 7/2016 | Cohen |
| 2016/0219802 A1 | 8/2016 | Ensworth |
| 2016/0219803 A1 | 8/2016 | Keren |
| 2016/0286741 A1 | 10/2016 | Kidachi |
| 2016/0286743 A1 | 10/2016 | Einav |
| 2016/0309669 A1 | 10/2016 | Kidachi |
| 2016/0330917 A1 | 11/2016 | Kidachi |
| 2017/0035005 A1 | 2/2017 | Kidachi |

FOREIGN PATENT DOCUMENTS

| | | |
|---|---|---|
| DE | 112706 | 5/1975 |
| EP | 0344605 A2 | 12/1989 |
| EP | 0444425 A1 | 9/1991 |
| EP | 0480632 A2 | 4/1992 |
| EP | 0549515 A1 | 6/1993 |
| EP | 636309 A1 | 2/1995 |
| EP | 0709020 A1 | 5/1996 |
| EP | 0730822 A2 | 9/1996 |
| EP | 493299 | 5/1997 |
| EP | 0872172 A1 | 10/1998 |
| FR | 2366790 | 5/1978 |
| GB | 2057960 A | 4/1991 |
| IL | 53463 A | 3/1983 |
| IL | 97564 A | 7/1996 |
| WO | 9205689 A1 | 4/1992 |
| WO | 9221228 A1 | 12/1992 |
| WO | 9427728 A1 | 12/1994 |
| WO | 9810635 | 3/1998 |
| WO | 9902273 A1 | 1/1999 |
| WO | 9918771 A1 | 4/1999 |
| WO | 9955141 A1 | 11/1999 |
| WO | 0001219 A1 | 1/2000 |
| WO | 0010378 A1 | 3/2000 |
| WO | 030760 A1 | 6/2000 |
| WO | 136106 A1 | 5/2001 |

(56) References Cited

FOREIGN PATENT DOCUMENTS

| WO | 0204130 A1 | 1/2002 |
|---|---|---|
| WO | 2003045577 A1 | 6/2003 |
| WO | 2003066228 A1 | 8/2003 |
| WO | 2004028778 A1 | 4/2004 |
| WO | 2007046105 | 10/2005 |
| WO | 2006030419 | 3/2006 |
| WO | 2007068523 A1 | 6/2007 |
| WO | 2010048063 | 4/2010 |
| WO | 2011092557 | 8/2011 |
| WO | 2013148672 | 10/2013 |
| WO | 2013155173 A2 | 10/2013 |
| WO | 2013192321 | 12/2013 |
| WO | 2014064452 | 5/2014 |
| WO | 2015098412 | 7/2015 |

OTHER PUBLICATIONS

Rain Bird Corporation, Drip Watering System 1994 Catalog, 1993, 16 pages.
Rain Bird Corporation, Landscape Irrigation Products 1993-1994 Catalog, Feb. 1993, 5 pp.
Rain Bird Corporation, Landscape Irrigation Products 2001-2001 Catalog, Mar. 2001, 9 pp.
Rain Bird Corporation, Landscape Irrigation Products 2005-2006 Catalog, Jun. 2004, 13 pp.
Rain Bird Corporation, Nursery Equipment Catalog 1986/1987, 1986, 3 pp.
Rain Bird Corporation, Turf Irrigation Equipment 1982 Catalog, 1982, 4 pp.
Rain Bird Corporation, Turf Irrigation Equipment 1983 Catalog, 1983, 4 pp.
Rain Bird Corporation, Turf Irrigation Equipment 1985 Catalog, 1985, 3 pp.
Rain Bird Corporation, Turf Irrigation Equipment 1987 Catalog, 1987, 6 pp.
Alam, M., et al., "Subsurface Drip Irrigation for Alfalfa," Kansas State University, 2009, pp. 1-8.
Alapati, Nanda K., Netafim Letter dated Mar. 30, 2012 with enclosure and attachments, 13 pages.
Alapati, Nanda K., Netafim Letter dated Mar. 30, 2012 with enclosure, 6 pages.
Arduini, I., et al., "Influence of Copper on Root Growth and Morphology of Pinus Pinea L. and Pinus Pinaster Ait. Seedlings," Tree Physiology, 15, 1995, pp. 411-415.
Bernard, H., et al., "Assessment of herbicide leaching risk in two tropical soils of Reunion Island (France)," J Environ Qual 34:534-543, (2005).
Beverage, K., "Drip Irrigation for Row Crops," New Mexico State University, 2001, pp. 1-43.
Borkow, G., et al., "A Novel Anti-Influenza Copper Oxide Containing Respiratory Face Mask," PLoS ONE, www.plosone.org, Jun. 2010, vol. 5, Issue 6, pp. 1-8.
Borkow, G., et al., "Copper as a Biocidal Tool," Current Medicinal Chemistry, 2005, 12, 2163-2175.
Borkow, G., et al., "Endowing Textiles with Permanent Potent Biocidal Properties by Impregnating Them with Copper Oxide," ResearchGate, Jan. 2006.
Borkow, G., et al., "Putting copper into action:copperimpregnated products with potent biocidal activities," FASEB J, 18:1728-1730, (2004).
Coder, K., "Tree Root Growth Control Series: Root Control Barriers," The University of Georgia, Mar. 1998, pp. 1-7.
Crawford, M., "Copper-Coated Containers and Their Impact on the Environment," Spin Out, 2003, pp. 76-78.
Crawford, M., "Update on Copper Root Control," Spin Out, 1997.
Diver, S., et al., "Sustainable Small-Scale Nursery Production," ATTRA, Nov. 2001, pp. 1-31.
Duke, K., et al., "Sewer Line Chemical Root Control with Emphasis on Foaming Methods Using Metam-Sodium and Dichiobenil," EPA United States Environmental Protection Agency, Sep. 1995.
Eason, Audra, et al., "Integrated modeling environment for statewide assessment of groundwater vulnerability from pesticide use in agriculture," Pest Manag Sci, 60:739-745 (online:2004).
European Patent Office, Extended European Search Report for European Application No. 13770084.5 dated Feb. 11, 2016, 7 pp.
European Patent Office, Office Action for European Application No. 10160675.4 dated Mar. 27, 2012, 2 pp.
European Patent Office, Search Report for European Application No. 10160675.4 dated Aug. 6, 2010, 2 pp.
Fitch, Even, Tabin & Flannery; Letter, Apr. 23, 2008, 1 p.
Giles-Parker, C, EPA, Pesticide Fact Sheet, pp. 1-4.
http://aasystems.eu/products11.html; Advanced Automation Systems Ltd. (1 p., dated Jun. 20, 2013).
http://metzerplas.com/en-US/50/845/; Meterplas Cooperative Agricultural Organization Ltd., (2 pp., dated Jun. 20, 2013).
Jaffe, E., Netafim Ltd., Patent Dept., Letter with attached Appendices A-B, Aug. 1, 2010, 35 pages.
Jaffe, E., Netafim Ltd., Patent Dept., Letter with attached claim charts, Feb. 4, 2008, 6 pages.
Jaffe, E., Netafim Ltd., Patent Dept., Letter with attached claim charts, Jul. 12, 2009, 4 pages.
Jaffe, E., Netafim Ltd., Patent Dept., Letter with attachment, Feb. 4, 2008, 7 pages.
Jaffe, E., Netafim, Ltd., Patent Dept., Letter with attached invoice, May 7, 2008, 2 pages.
Jiang, W. et al., "Effects of Copper on Root Growth, Cell Division, and Nucleolus of Zea Mays," Biologia Plantarum, 44(1), 2001, pp. 105-109.
Kuhns, L. et al., "Copper Toxicity in Woody Ornamentals," Journal of Arboriculture, Apr. 1976. pp. 68-78.
Mastin, B.J., et al., "Toxicity and bioavailability of copper herbicides (Clearigate, Cutrine-Plus, and copper sulfate) to freshwater animals," Arch Environ Contam Toxicol, 39:445-451, (2000).
Murray-Gulde, C.L., et al., "Algicidal effectiveness of Clearigate, Cutrine-Plus, and copper sulfate and margins of safety associated with their use," Arch Environ Contam Toxicol 42:19-27, (2002).
Netafim International—Netafim USA—Internet site, 2003, 5 pages.
Netafim Ltd., Appendix A, images of Netafim's Drip Net product, 1 page.
Netafim Ltd., Appendix A, marked-up images of Netafim's Ram product, 1 page.
Netafim Ltd., Appendix B, Invoice, Jan. 31, 1991, 1 page.
Netafim Ltd., Appendix C, Netafim RAM Catalog, Jan. 2000, 4 pages.
Netafim Ltd., Appendix D, Englarged, marked-up excerpts from Netafim RAM Catalog, Jan. 2000, 1 page.
Netafim USA, RAM Catalog Figures, Jan. 2000, 4 pages.
Netafim USA, Triton X Heavywall Dripperline Catalog, May 2007, 8 pages.
Patent Cooperation Treaty, Application No. PCT/US2013/033866, International Search Report and Written Opinion dated Jun. 19, 2013, 38 pp.
Patent Cooperation Treaty, International Search Report issued in International Application No. PCT/US2013/046603, dated Sep. 19, 2013, 2 pp.
Patent Cooperation Treaty, Notification of Transmittal of the International Search Report and the Written Opinion of the International Searching Authority issued in International Application No. PCT/US2013/033668, dated Jun. 17, 2013, 10 pp.
Patent Cooperation Treaty, Notification of Transmittal of the International Search Report and the Written Opinion of the International Searching Authority issued in International Application No. PCT/US2014/050623, dated Nov. 20, 2014, 17 pp.
Patent Cooperation Treaty, Written Opinion of the International Searching Authority issued in International Application No. PCT/US2013/046603, dated Sep. 19, 2013, 4 pp.
PCT International Application No. PCT/US2013/033866 filed Mar. 26, 2013.
Rain Bird Corporation, Landscape Irrigation Products 1993-1994 Catalog, p. 120, Feb. 1993, 3 pages.

(56) References Cited

OTHER PUBLICATIONS

Rain Bird Corporation, Landscape Irrigation Products 2001-2002 Catalog, pp. 181-184, Mar. 2001, 6 pages.
Rain Bird Corporation, Landscape Irrigation Products 2005-2006 Catalog, pp. 230-232; 247-250, Jun. 2004, 10 pages.
Rain Bird Corporation, Landscape Irrigation Products 2006-2007 Catalog, p. 222-224; 238-242, Jul. 2005, 11 pages.
Rain Bird Corporation, PC Dripline Pressure Compensating Inline Emitter Tubing Catalog, Oct. 1998, 16 pages.
Rain Bird Corporation, Turf Irrigation Equipment 1985 Catalog, p. 73, 1985, 3 pages.
RAM Invoice Jan. 31, 1991.
Schifris, Seba et al., "Inhibition of root penetration in subsurface driplines by impregnating the drippers with copper oxide particles," Irrigation Science (2015) 33:4, pp. 319-324.
Smiley, E. T., "Root Growth Near Vertical Root Barriers," International Society of Arboriculture, 1995, pp. 150-152.
Spera, G., et al., "Subsurface drip irrigation with micro-encapsulated trifluralin. Trifluralin residues in soils and cultivations," Commun Agric Appl Biol Sci 71:161-170, (2006).
State Intellectual Property Office, First Office Action issued in Chinese Application No. 201380016629.9, dated Nov. 4, 2015, 16 pp.
The Clean Estuary Partnership, "Copper Sources in Urban Runoff and Shoreline Activities," TDC Environmental, LLC, 2004, pp. 1-72.
U.S. Appl. No. 11/359,181, filed Feb. 22, 2006, entitled "Drip Emitter," and dated Jan. 19, 2010 as U.S. Pat. No. 7,648,085.
U.S. Appl. No. 11/394,755, filed Mar. 31, 2006, entitled "Drip Emitter."
U.S. Appl. No. 12/347,266, filed Dec. 31, 2008, entitled "Low Flow Irrigation Emitter."
U.S. Appl. No. 12/367,295, filed Feb. 6, 2009, entitled "Low Flow Irrigation Emitter."
U.S. Appl. No. 12/436,394, filed May 6, 2009, entitled "Drip Emitter and Methods of Assembly and Mounting."
U.S. Appl. No. 12/495,178, filed Jun. 30, 2009, entitled "Drip Emitter."
U.S. Appl. No. 12/495,193, filed Jun. 30, 2009, entitled "Drip Emitter," which is a continuation of U.S. Appl. No. 11/359,181.
U.S. Appl. No. 13/430,249, filed Mar. 26, 2012.
USPTO; U.S. Appl. No. 13/964,903, filed Aug. 12, 2013.
USPTO; U.S. Appl. No. 14/139,217, filed Dec. 23, 2013.
USPTO; U.S. Appl. No. 11/394,755, Office Action dated Aug. 14, 2008.
USPTO; U.S. Appl. No. 11/394,755, Office Action dated Feb. 7, 2008.
USPTO; U.S. Appl. No. 11/394,755, Office Action dated Jul. 17, 2007.
USPTO; U.S. Appl. No. 11/394,755, Office Action dated Jul. 17, 2009.
USPTO; U.S. Appl. No. 11/394,755, Office Action dated Mar. 31, 2009.
USPTO; U.S. Appl. No. 11/394,755, Office Action dated May 12, 2011.
USPTO; U.S. Appl. No. 11/394,755; Office Action dated Dec. 19, 2011.
USPTO; U.S. Appl. No. 12/347,266, Office Action dated Mar. 7, 2011.
USPTO; U.S. Appl. No. 12/347,266, Office Action dated Nov. 17, 2010.
USPTO; U.S. Appl. No. 12/347,266, Office Action dated Sep. 7, 2010.
USPTO; U.S. Appl. No. 12/367,295, Office Action dated Feb. 11, 2011.
USPTO; U.S. Appl. No. 12/367,295, Office Action dated Jul. 15, 2011.
USPTO; U.S. Appl. No. 12/367,295; Office Action dated Jun. 8, 2012.
USPTO; U.S. Appl. No. 12/495,178, Office Action dated Feb. 3, 2010.
USPTO; U.S. Appl. No. 12/495,178; Office Action dated Apr. 18, 2014.
USPTO; U.S. Appl. No. 12/495,178; Office Action dated Jun. 21, 2012.
USPTO; U.S. Appl. No. 12/495,178; Office Action dated Mar. 11, 2015.
USPTO; U.S. Appl. No. 12/495,178; Office Action dated Nov. 18, 2014.
USPTO; U.S. Appl. No. 12/495,178; Office Action dated Oct. 6, 2015.
USPTO; U.S. Appl. No. 12/495,193, Office Action dated Jan. 6, 2012.
USPTO; U.S. Appl. No. 12/495,193, Office Action dated May 11, 2011.
USPTO; U.S. Appl. No. 12/495,193; Advisory Action dated Sep. 5, 2013.
USPTO; U.S. Appl. No. 12/495,193; Notice of Allowance dated Oct. 14, 2016.
USPTO; U.S. Appl. No. 12/495,193; Office Action dated Apr. 18, 2014.
USPTO; U.S. Appl. No. 12/495,193; Office Action dated Aug. 29, 2016.
USPTO; U.S. Appl. No. 12/495,193; Office Action dated Jan. 15, 2015.
USPTO; U.S. Appl. No. 12/495,193; Office Action dated Jun. 18, 2013.
USPTO; U.S. Appl. No. 12/495,193; Office Action dated Oct. 1, 2015.
USPTO; U.S. Appl. No. 13/430,249; Notice of Allowance dated Apr. 14, 2016.
USPTO; U.S. Appl. No. 13/430,249; Notice of Allowance dated Sep. 19, 2016.
USPTO; U.S. Appl. No. 13/430,249; Office Action dated Mar. 24, 2015.
USPTO; U.S. Appl. No. 13/430,249; Office Action dated Oct. 26, 2015.
USPTO; U.S. Appl. No. 13/800,354; Office Action dated Sep. 25, 2014.
USPTO; U.S. Appl. No. 13/964,903; Office Action dated Jun. 3, 2015.
USPTO; U.S. Appl. No. 13/964,903; Office Action dated Mar. 7, 2016.
USPTO; U.S. Appl. No. 14/047,489; Office Action dated Jun. 29, 2015.
USPTO; U.S. Appl. No. 14/047,489; Office Action dated Oct. 7, 2015.
USPTO; U.S. Appl. No. 14/139,217; Office Action dated Apr. 8, 2015.
USPTO; U.S. Appl. No. 14/139,217; Office Action dated Sep. 18, 2015.
USPTO; U.S. Appl. No. 14/385,564; Office Action dated Aug. 10, 2016.
USPTO; U.S. Appl. No. 14/475,435; Office Action dated Jul. 20, 2016.
USPTO; U.S. Appl. No. 13/964,903; Office Action dated Oct. 31, 2016.
Wagar, J. Alan, et al., "Effectiveness of Three Barrier Materials for Stopping Regenerating Roots of Established Trees," Journal of Arboriculture, 19(6), Nov. 1993, pp. 332-338.
Westgate, Philip J., "Preliminary Report on Copper Toxicity and Iron Chlorosis in Old Vegetable Fields," Florida State Horticultural Society, 1952, pp. 143-146.
USPTO; U.S. Appl. No. 12/495,193; Notice of Allowance dated Feb. 10, 2017.
USPTO; U.S. Appl. No. 14/475,435; Office Action dated Jan. 26, 2017.
USPTO; U.S. Appl. No. 12/495,193; Notice of Allowance dated May 4, 2017.
USPTO; U.S. Appl. No. 14/385,564; Office Action dated Mar. 10, 2017, 8 pages.

(56) References Cited

OTHER PUBLICATIONS

USPTO; U.S. Appl. No. 14/518,774; Office Action dated May 10, 2017.
USPTO; U.S. Appl. No. 14/851,545; Office Action dated Apr. 24, 2017.
USPTO; U.S. Appl. No. 15/344,843; Office Action dated Apr. 28, 2017.

* cited by examiner

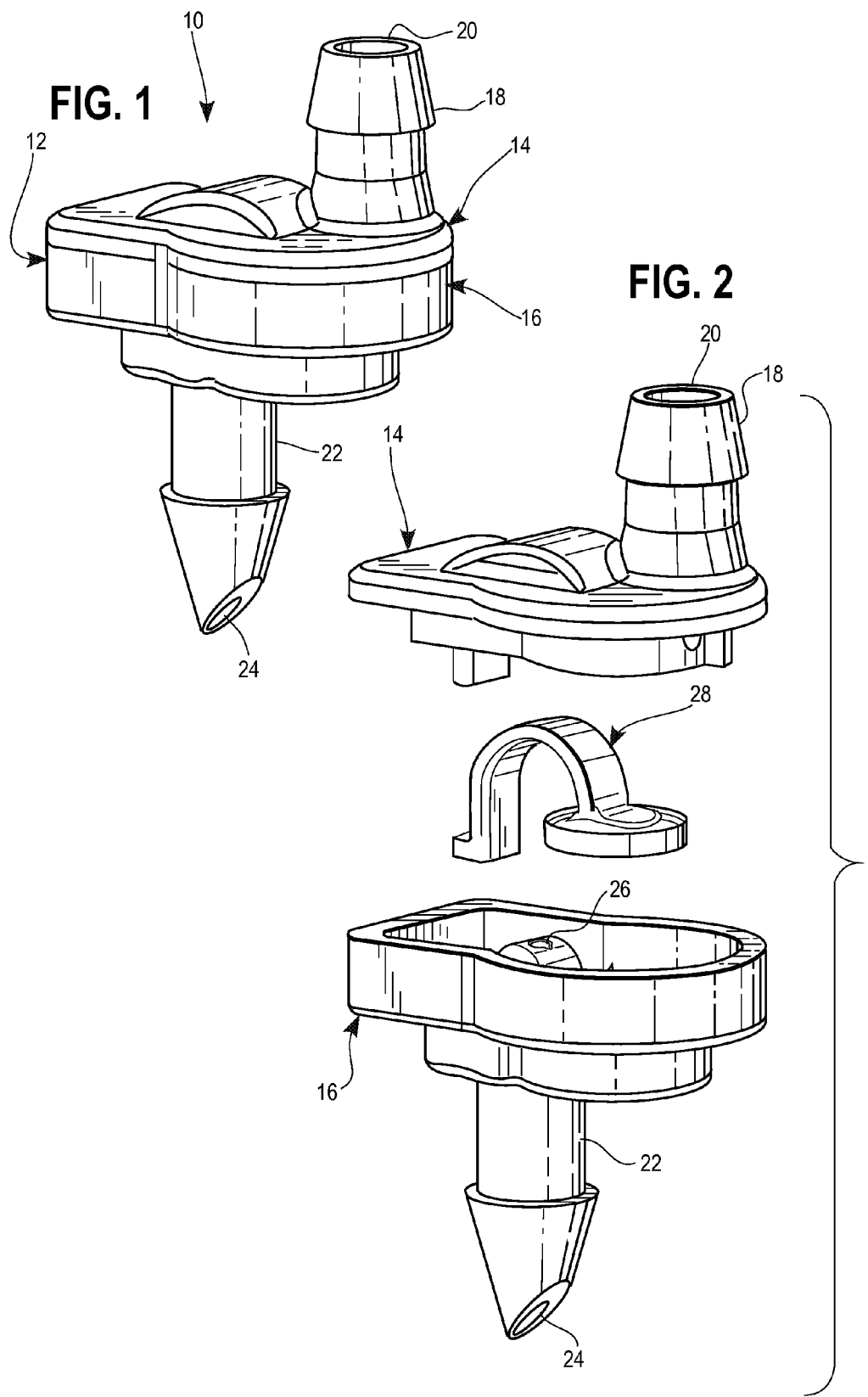

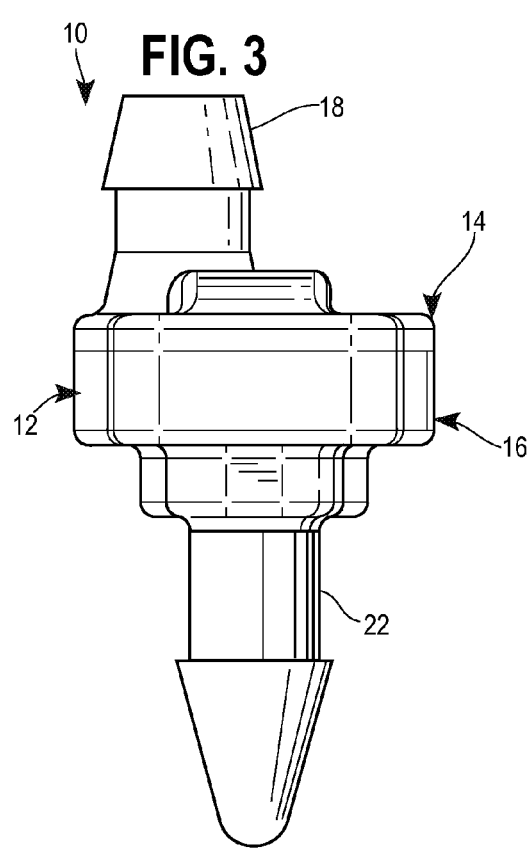
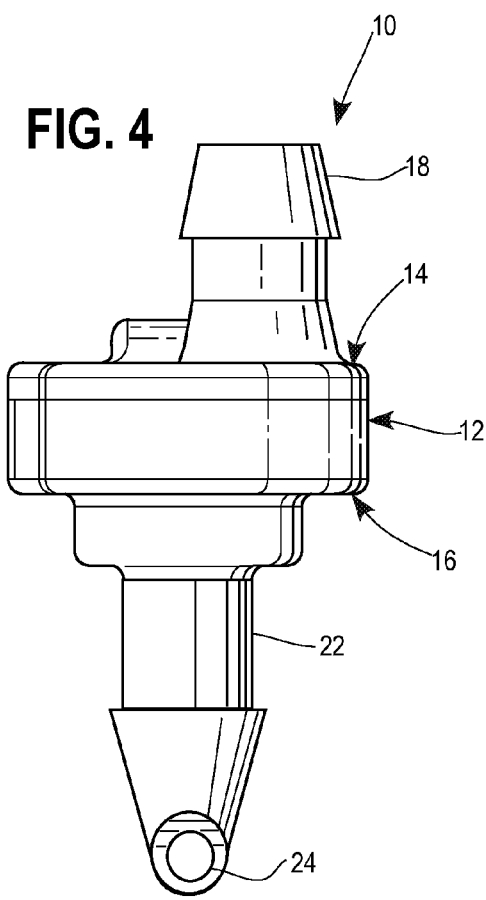
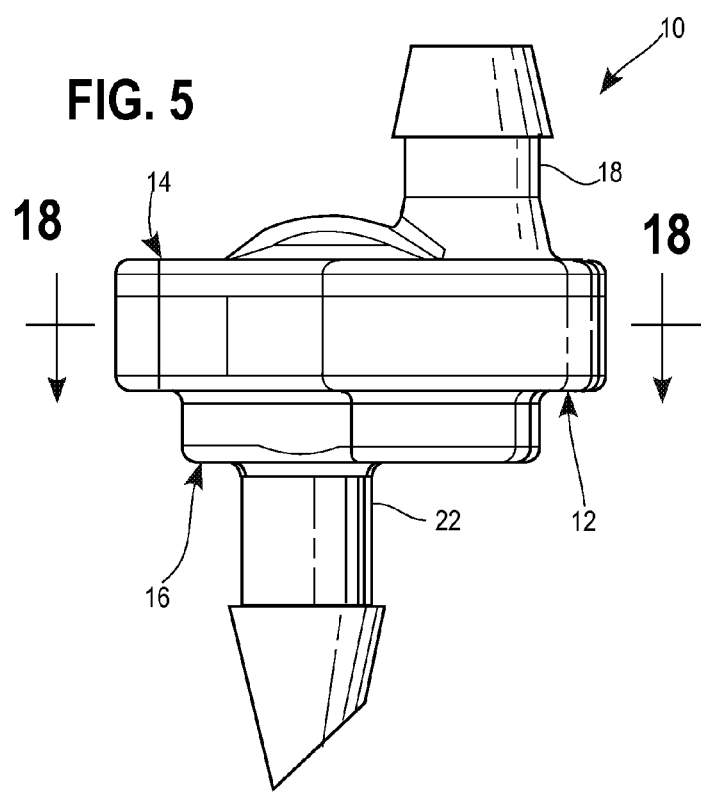

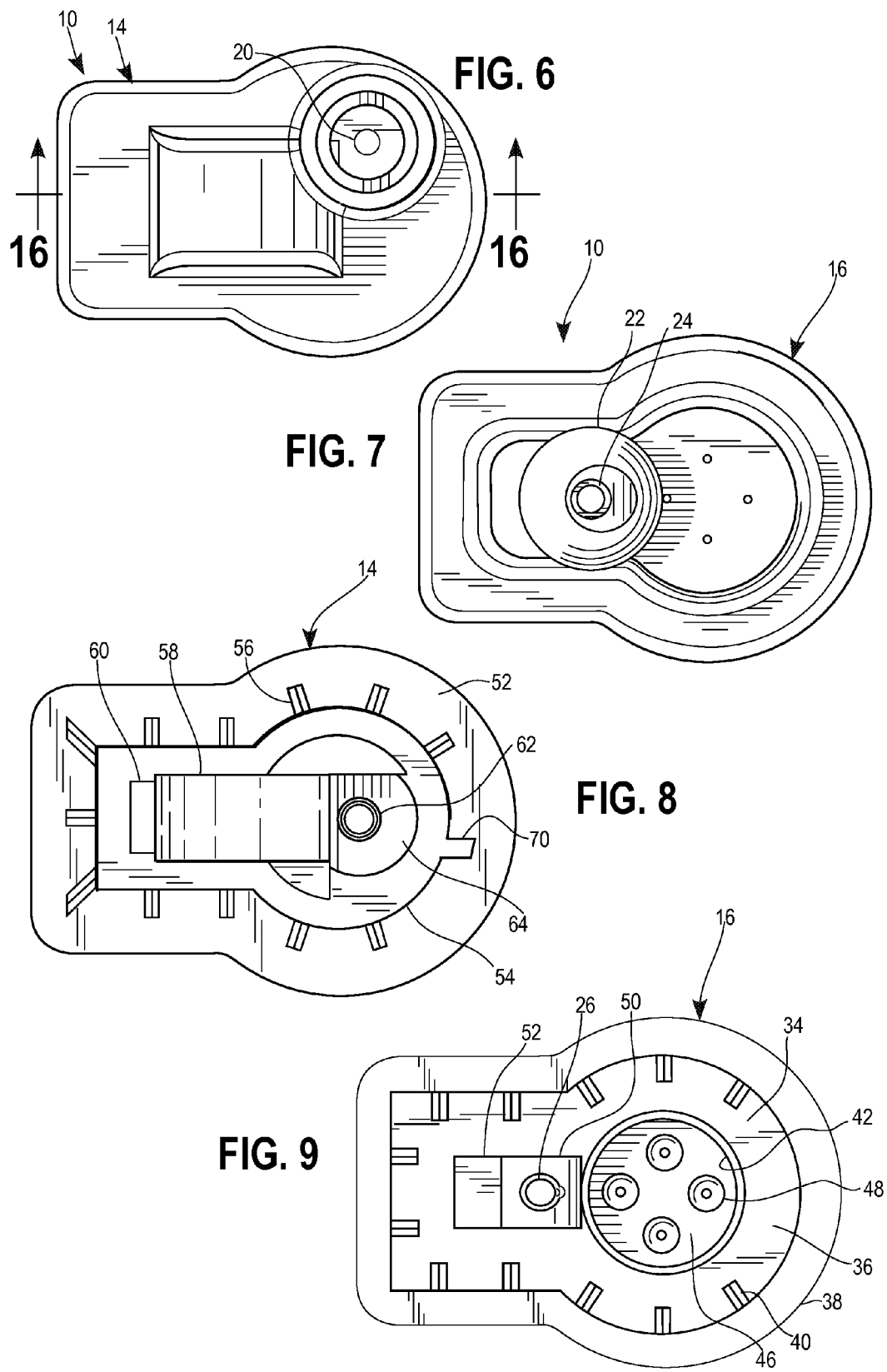

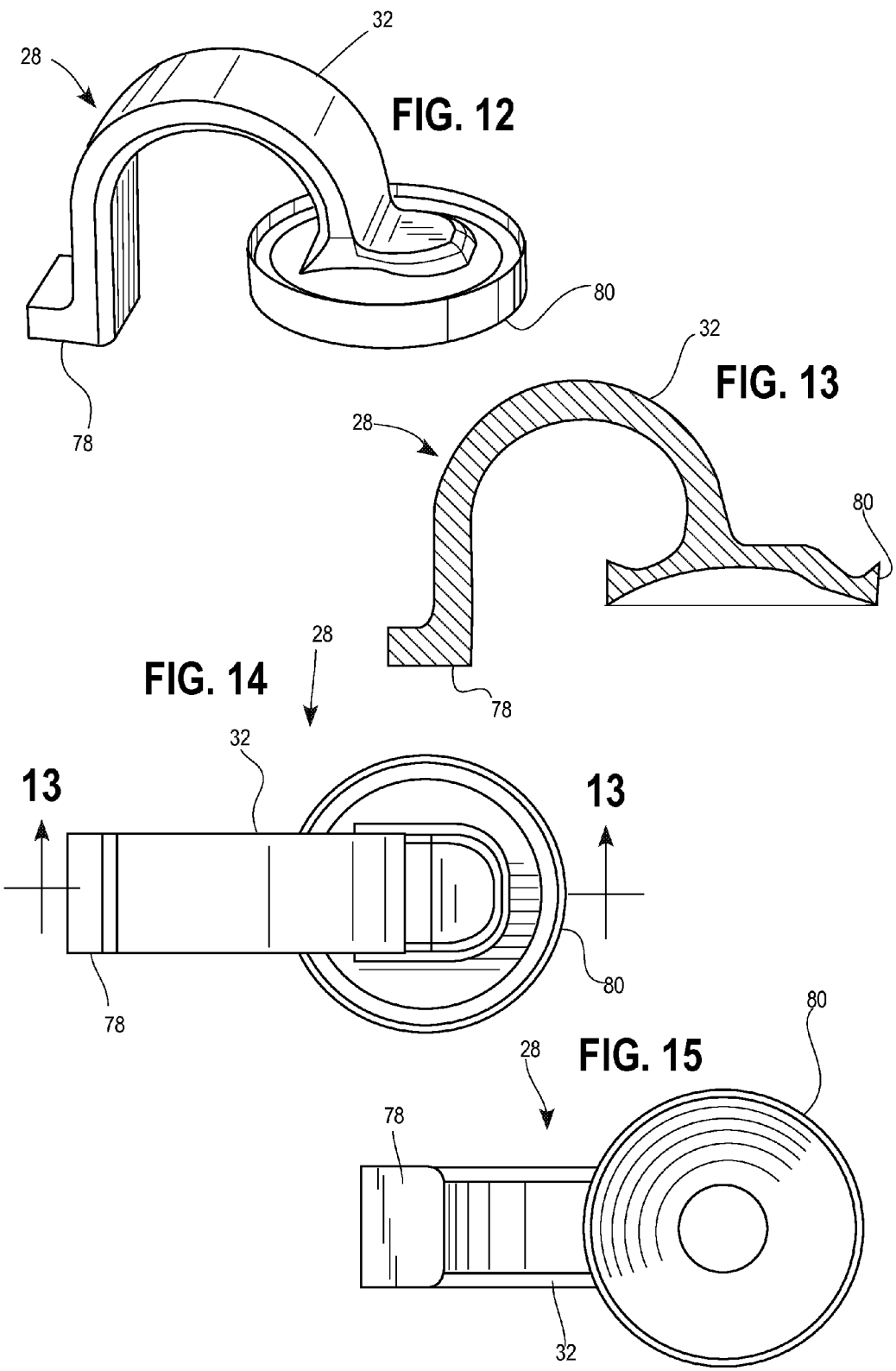

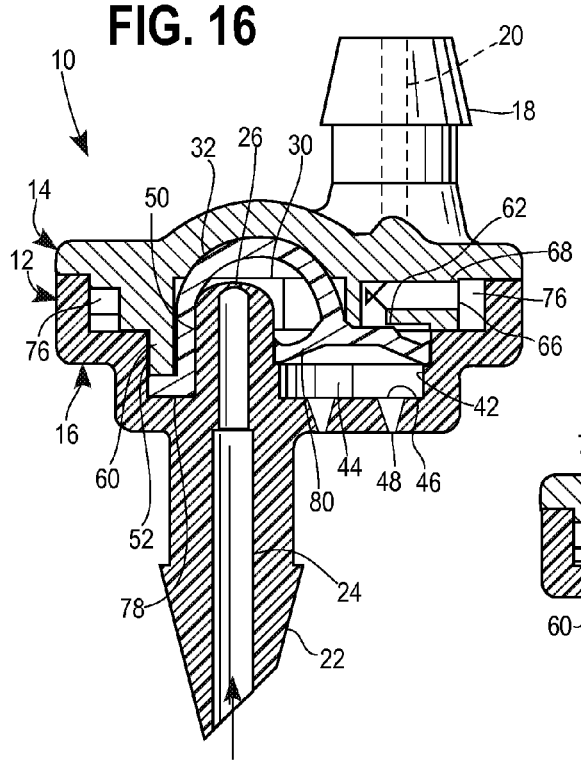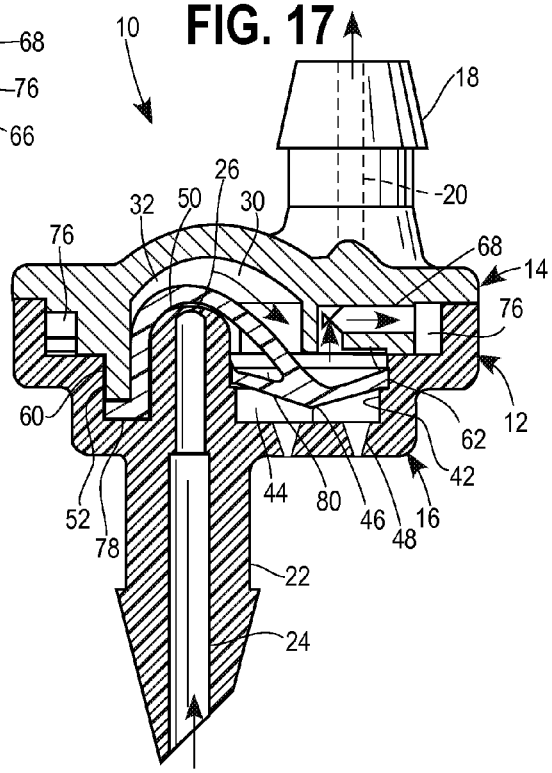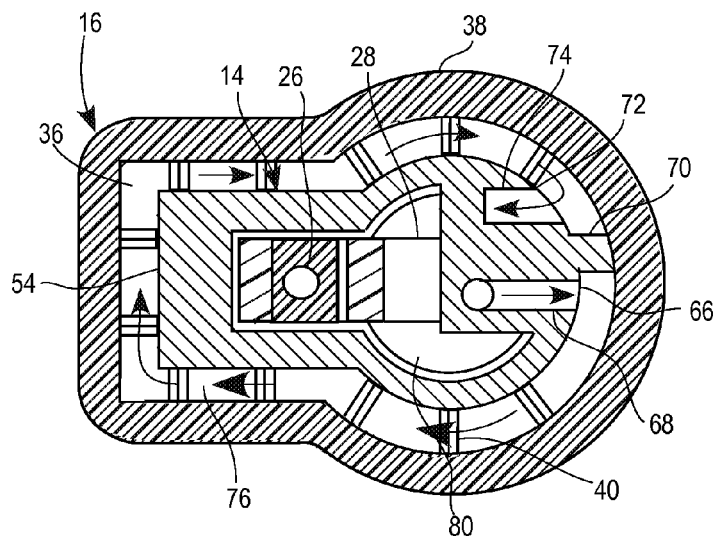

DRIP EMITTER

FIELD

A drip emitter suitable for use in irrigation systems is provided and, in particular, a drip emitter configured for tolerating larger grit sizes.

BACKGROUND

One configuration of drip emitters is to have a tortuous path upstream of a pressure regulation zone. The tortuous path is configured to reduce pressure upstream of the pressure regulation zone. The pressure regulation zone, such as a metering groove, is configured to maintain a generally constant pressure when the drip emitter is in use. However, such a configuration can disadvantageously prevent large grit from passing through the drip emitter when in use due to the reduced cross section of the flow path needed to reduce pressure in the tortuous path.

SUMMARY

A drip emitter is described herein that is advantageously configured to allow large grit to pass through the drip emitter when in use. The drip emitter includes a housing containing a flow path extending between a water inlet and a water outlet, a pressure-reducing segment, such as a tortuous path, of the flow path downstream of the inlet and upstream of the outlet, and a dynamic pressure regulator downstream of the water inlet and upstream of the pressure-reducing segment of the flow path. The dynamic pressure regulator is configured such that a decrease in pressure in the pressure-reducing segment of the flow path causes the dynamic pressure regulator to adjust to maintain a generally constant rate of flow through the water inlet as compared to the rate of flow when there is no decrease in pressure in the pressure-reducing segment of the flow path.

When large grit is partially blocking the water inlet, thereby potentially decreasing the rate of flow of water through the drip emitter, the dynamic pressure regulator can advantageously adjust to allow for the rate of water flow to remain generally constant. Moreover, the dynamic pressure regular can further adjust to allow for large grit to pass through the drip emitter, such as if there is a pressure surge at an end of an irrigation cycle or if there is a large built up of grit in the water inlet. The flow path through the drip emitter can have a minimum size greater than the minimum size of drip emitters having tortuous paths upstream of a pressure regulation zone, thereby advantageously allowing for larger grit to pass through the drip emitter and improving the overall grit tolerance of the drip emitter.

In one aspect of the drip emitter, the dynamic pressure regulator includes a first portion and a second portion. The first portion is moveable toward the water inlet in response to increased pressure acting on the second segment when there is a higher pressure in the pressure-reducing segment of the flow path and is moveable away from the water inlet in response to relatively decreased pressure acting on the second segment when there is a lower pressure in the pressure-reducing segment of the flow path. The second segment of the dynamic pressure regulator can have a diaphragm having one side facing the flow path and an opposite side exposed to the environment external to the housing.

In another aspect, the drip emitter can include check valve for substantially or completely blocking the flow path upstream of the pressure-reducing segment of the flow path and downstream of the water inlet in response to the pressure on the one side of the diaphragm facing the flow path being less than the pressure on the opposite side of the diaphragm that is exposed to the environment external to the housing. The check valve can be formed between the diaphragm and a portion of the housing. The diaphragm can be moveable toward the portion of the housing when the pressure on the one side of the diaphragm facing the flow path is less than the pressure on the opposite side of the diaphragm that is exposed to the environment external to the housing and moveable away from the portion of the housing when the pressure on the one side of the diaphragm facing the flow path is greater than the pressure on the opposite side of the diaphragm that is exposed to the environment external to the housing.

In another aspect, the housing of the drip emitter can have a lower portion and an upper portion. The pressure reducing segment of the flow path, such as a tortuous path, can be defined at least in part between the lower portion and the upper portion of the housing. The lower portion of the housing can include the water inlet and the upper portion can include the water outlet.

In yet another aspect, the drip emitter can have a pressure regulation zone defined as a gap between the water inlet and the first portion of the dynamic pressure regulator. The dynamic pressure regulator can be configured such that a decrease in pressure in the pressure-reducing segment of the flow path causes the dynamic pressure regulator to adjust to maintain a generally constant rate of flow through the water inlet by increasing the size of the gap of the pressure regulation zone as compared to the size of the gap when there is no decrease in pressure in the pressure-reducing segment of the flow path. Thus, when grit is partially blocking the water inlet, the gap of the pressure regulation zone can increase so the flow rate remains generally constant as compared to before the grit was partially blocking the water inlet.

In another aspect of the drip emitter, the lower portion of the housing has a diaphragm chamber in which the diaphragm is seated. The diaphragm divides the diaphragm chamber into a portion facing the flow path and a portion facing at least one port in communication with the environment external to the housing.

In yet another aspect of the drip emitter, the dynamic pressure regulator can be a flexible member, such as a unitary flexible member.

In another aspect of the drip emitter, the lower portion of the housing can have a barbed member with a flow path therethrough and in fluid communication with and upstream of the water inlet. An entrance to the tortuous path can be in the upper portion of the housing and an exit from the tortuous path can also be in the upper portion of the housing. The water outlet can include a flow path through a barbed member of the upper portion of the housing.

The drip emitters described herein can be attached to a length of drip irrigation tubing. The barbed member of the lower portion of the housing can extend into an interior of the length of drip irrigation tubing so that a flow path from the interior of the length of drip irrigation tubing into the drip emitter is provided. The barbed member of the upper portion of the housing can be disposed outside of the interior of the drip irrigation tubing.

The drip emitters described herein can also be part of an irrigation system having a water source, a control zone valve or a plurality of such valves, and a length of drip irrigation tubing downstream of the valve, or multiple such lengths if multiple valves. The drip irrigation tubing can be in fluid communication with a plurality of the drip emitters for discharging fluid from the water source through the drip emitters when the control zone valve is open.

BRIEF DESCRIPTION OF THE DRAWINGS

FIG. 1 is a perspective view of a drip emitter having a dynamic pressure regulator upstream of a pressure reducing segment of a flow path through the drip emitter;

FIG. 2 is an exploded view of the drip emitter of FIG. 1, showing a housing comprising an upper portion and a lower portion with a dynamic pressure regulator therebetween;

FIG. 3 is a rear elevation view of the drip emitter of FIG. 1;

FIG. 4 is a front elevation view of the drip emitter of FIG. 1;

FIG. 5 is a right side elevation view of the drip emitter of FIG. 1, the left side elevation view being the mirror image thereof;

FIG. 6 is a top plan view of the drip emitter of FIG. 1;

FIG. 7 is a bottom plan view of the drip emitter of FIG. 1;

FIG. 8 is a bottom plan view of the top portion of the housing of the drip emitter of FIG. 1;

FIG. 9 is a top plan view of the bottom portion of the housing of the drip emitter of FIG. 1;

FIG. 12 is a perspective view of the dynamic pressure regulator of the drip emitter of FIG. 1;

FIG. 13 is a cross sectional view of the dynamic pressure regulator taken along line 13-13 of FIG. 14;

FIG. 14 is a top plan view of the dynamic pressure regulator of FIG. 12;

FIG. 15 is a bottom plan view of the dynamic pressure regulator of FIG. 12;

FIG. 16 is a cross section view of the drip emitter taken along line 16-16 of FIG. 6 and showing a check valve closed to block flow through the drip emitter;

FIG. 17 is a cross section view of the drip emitter similar to that of FIG. 16, but showing the check valve open to permit flow through the drip emitter;

FIG. 18 is a cross section view of the drip emitter taken along line 18-18 of FIG. 5 and showing the pressure reducing segment of the flow path through the drip emitter.

DETAILED DESCRIPTION

Figure 19:
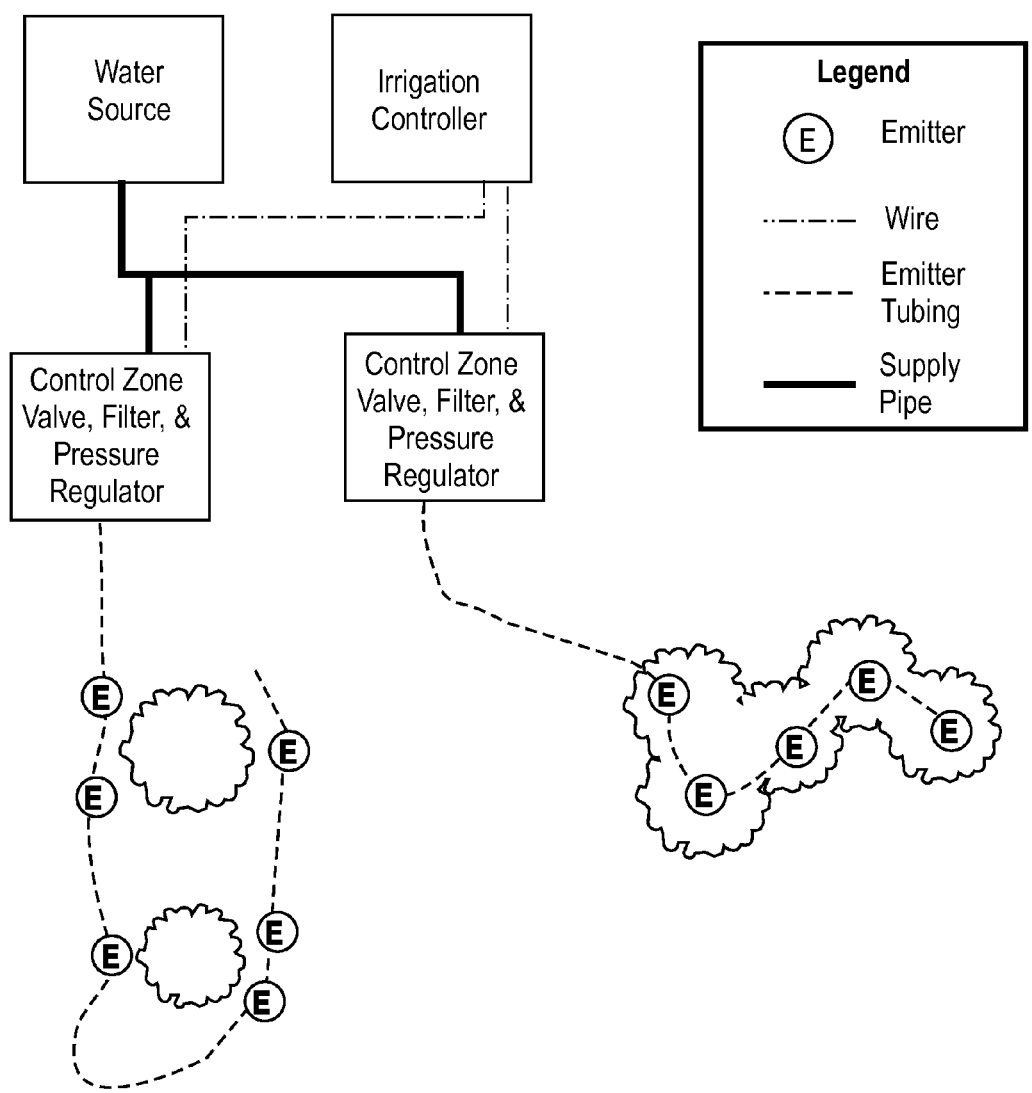
FIG. 19 is a diagram of an irrigation system incorporating a plurality of drip emitters of FIG. 1.

An exemplary embodiment of a drip emitter is described herein and depicted in FIGS. 1-18 and shown as part of a system in FIG. 19, where the drip emitter is advantageously configured to allow large grit to pass through the drip emitter when in use. This is accomplished in part by having relatively larger minimum cross sectional flow areas in a flow path extending between a water inlet and a water outlet as compared to prior drip emitters. For instance, in an exemplary embodiment there is no fixed cross section smaller than 0.04 inches. This can allow larger sized grit to pass through, e.g., grit of 0.02 inches in diameter or size 30 mesh particles. The relatively larger minimum cross sectional flow areas are achieved in part by having a pressure-reducing segment of the flow path, such as a tortuous path, downstream of the inlet and upstream of the outlet, and providing a dynamic pressure regulator downstream of the water inlet and upstream of the pressure-reducing segment of the flow path. The dynamic pressure regulator operates to cause the dynamic pressure regulator to adjust to maintain a generally constant rate of flow through the water inlet, even when grit partially blocks flow through the inlet. The dynamic pressure regulator can also adjust to a degree sufficient to allow for grit to pass through the remainder of the flow path. The dynamic pressure regulator can optionally be configured as part of a check valve for blocking or substantially blocking flow through the drip emitter when water pressure applied to the water inlet is below a certain threshold.

The drip emitter 10 has a housing 12 formed of an upper portion 14 and a lower portion 16, as shown in FIGS. 1-5. The upper portion 14 of the housing 12 has a barbed outlet port 18. At least part of the water outlet 20 extends through the outlet port 18, as shown in FIGS. 16 and 17. The lower portion 16 of the housing 12 has a barbed inlet port 22 with an internal fluid path 24 in fluid communication with the water inlet 26, also as shown in FIGS. 16 and 17. The barbed inlet port 22 is optionally configured to pierce a sidewall of a length of flexible irrigation tubing for establishing fluid communication with the interior thereof.

A dynamic pressure regulator 28 is disposed in an interior cavity 30 between the upper and lower portions 14 and 16 of the housing 12, as shown in FIGS. 2 and 16-18. The dynamic pressure regulator 28 has two main functions. First, the pressure regulator 28 modulates the size of a gap of a pressure regulation zone disposed between the water inlet 26 and an arcuate span 32 of the regulator 28 in order to maintain a generally constant flow rate through the drip emitter 10, as will be described in further detail below. Second, the pressure regulator 28 is part of a check valve that blocks or substantially blocks flow into the downstream pressure reducing segment of the flow path when the pressure at the water inlet 26 is below a predetermined threshold amount or range, as will also be described in further detail below.

Figure 10:
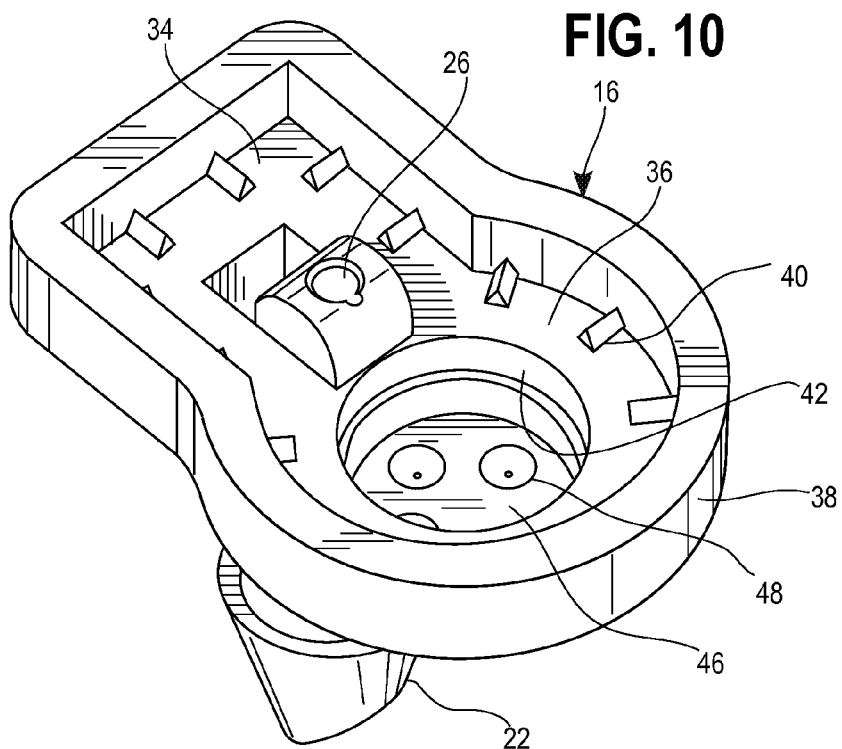
FIG. 10 is a top perspective view of the bottom portion of the housing of the drip emitter of FIG. 1.

The bottom portion 16 of the housing of the drip emitter 10 has an inner cavity 34 with a bottom wall 36 and a surrounding upstanding peripheral wall 38, as shown in FIGS. 9 and 10. The bottom wall 36 has a plurality of upstanding baffles 40 about the perimeter and adjacent to the peripheral wall. The baffles 40 are part of the tortuous path, as will be described in greater detail herein. The bottom wall 36 has an annular depression 42 that forms a diaphragm chamber 44, as will be described in greater detail herein. The diaphragm chamber 44 has a bottom wall 46 of its own with a plurality of ports 48 through which ambient air from the environment outside the housing 12 can communicate with the diaphragm chamber 44 for purposes that will be described in further detail. Adjacent the diagram chamber 44 is a raised arcuate hump 50 of the bottom wall 36. The water inlet 26 extends through the arcuate hump 50 and is in fluid communication with the internal fluid path 24 of the barbed inlet port 22, as is shown in FIGS. 16 and 17. Disposed on an opposite side of the hump 50 is a recess 52 in the bottom wall 36 for receiving a portion of the dynamic pressure regulator 28.

Figure 11:
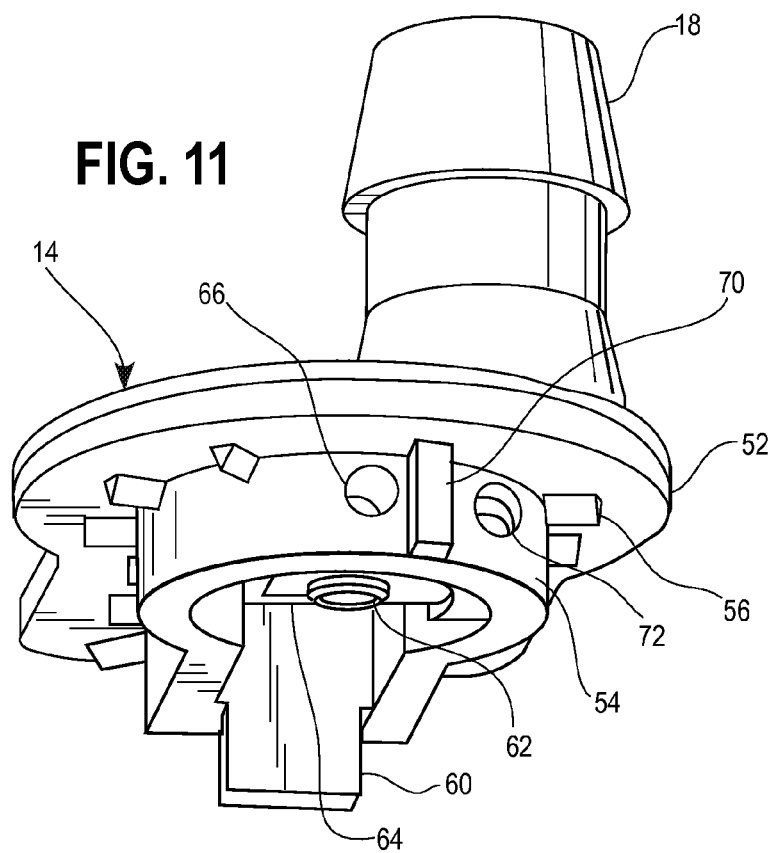
FIG. 11 is a bottom perspective view of the top portion of the housing of the drip emitter of FIG. 1.

The top portion 14 of the housing 12 of the drip emitter 10 has a cap 52 with a depending, closed wall 54, as shown in FIGS. 8 and 11. The cap 52 is designed to enclose the inner cavity 34 of the bottom portion 16 of the housing 12 of the drip emitter 10. Disposed on the underside of the cap 52 and adjacent the closed wall 54 are multiple baffles 56.

These baffles 56 are part of the tortuous path, as will be described in greater detail herein. Within the closed wall 54 is an arcuate depression 58. A depending, rectangular peg 60 extends away from the cap 52 and in the same direction as the closed wall 54. A valve seat 62 is formed on a raised block 64 within the closed wall 54. The valve seat 62 communicates with an entrance 66 to the exterior of the closed wall 54 via an internal path 68 within the raised block 64, as shown in FIG. 18. A barrier 70 projects outwardly from the closed wall 54. An exit opening 72 in fluid communication with the water outlet 20 partially via an internal path 74 within the raised block 64 is disposed on an opposite side of the barrier 70 from the entrance 66.

When assembled, the upper and lower portions 14 and 16 of the housing 12 cooperate to define the tortuous path 76. More specifically, the cap 52 of the upper portion 14 of the housing 12 seats on the peripheral wall 38 of the lower portion 16 of the housing 12 and, when so seated, the closed wall 54 of the upper portion 14 of the housing 12 is inwardly spaced from and forms a channel between the peripheral wall 38 of the lower portion 16 of the housing 12, as shown in FIG. 18. Fluid can enter the tortuous path 76 via the valve seat and the entrance 66, pass between the baffles 40 and 56 arranged in an alternating pattern, and then exit via the exit opening 72 and flow to the water outlet 20, as is shown by the flow-indicating arrows in FIG. 18. The barrier 70 functions to prevent the flow of water from taking a short path between the entrance and exit openings 66 and 72.

Turning now to details of the dynamic pressure regulator 28, shown in FIGS. 2 and 12-15, the regulator 28 has the arcute span 32 with a retention flap 78 at one end and a diaphragm 80 at the opposite end. The regulator 28 is made of a unitary, flexible material, such as liquid molded silicon.

When assembled, the retention flap 78 of the regulator sits within the recess 52 in the bottom wall 34 of the bottom portion 16 of the housing 12. The peg 60 of the upper portion 14 of the housing 12 is sized to extend into the recess 52 so as to pinch the retention flap 78 therebetween to secure that end of the regulator 28 relative to the housing. The arcuate span 32 is positioned directly over the hump 50 extending upward from the bottom wall 34 of the bottom portion of the housing 12 and, in particular, directly over the water inlet 26. The arcuate span 32 generally corresponds to and is partially positioned in the arcuate recess 58 in cap of the top portion 14 of the housing 12. The diaphragm 80 is seated in the diaphragm chamber 44 of the housing 12 and divides the chamber 44 into a portion within the flow path internal to the housing and an ambient portion that is disposed between the diaphragm 80 and the bottom wall 46 of the diaphragm chamber 44.

Having described the structure of the drip emitter 10, the multiple modes of operation of the drip emitter 10 will now be described. In particular, the drip emitter 10 has an unpressurized mode that corresponds to little or no pressure at the water inlet 26, or a pressure below a certain threshold or range, and a pressurized mode. In the unpressurized mode, shown in FIG. 16, the check valve of the drip emitter 10 is closed or substantially closed to block fluid flow through the emitter 10. While there is little or no pressure, such as 0.5 psi or less, residual water in a supply line can be stopped from seeping out of the drip emitter 10. In the pressurized mode, shown in FIG. 17, the pressure at the water inlet 26 is above a certain threshold or range, such as 3.5 or 5 psi, and the check valve is open to allow fluid to flow through the drip emitter 10 and for downstream irrigation.

The check valve is formed between the regulator 28, e.g., the diaphragm 80 thereof, and the valve seat 62. When the two are engaged, as shown in FIG. 16, flow of water past the valve seat 62 is blocked. Conversely, when the two are not engaged, as shown in FIG. 17, water can flow through the drip emitter 10. The movement of the diaphragm 80 either against or away from the valve seat 62 is a function of the differential between the pressure acting on the side of the diaphragm 80 facing the flow path and the pressure acting on the side of the diaphragm 80 facing the ambient portion of the diaphragm chamber 44. When the pressure on the side of the diaphragm 80 facing the ambient portion of the diaphragm chamber 44 is greater, such as when there is little or no flow to the water inlet 26, the diaphragm 80 will shift to block flow through the valve seat 62. When the pressure on the side of the diaphragm 80 facing the flow path is greater, such as when pressurized water is supplied to the water inlet 26, the diaphragm 80 will move away from the valve seat 62 to allow flow therethrough.

As mentioned above, one of the functions of the dynamic pressure regulator 28 is to regulate the pressure at a location upstream of the tortuous path 76 and downstream of the water inlet 26. This is accomplished using movement of the regulator 28. More specifically, a pressure regulation zone or point is defined by a gap between the water inlet 26 and a portion of the arcuate span 32 of the regulator 28. The water exiting the water inlet 26 will deflect laterally upon impact with the arcuate span 32 and then flow toward the tortuous path 76. When the drip emitter 10 is in the pressurized mode, shown in FIG. 17, the size of the gap varies in response to the pressure within the flow path between the water inlet 26 and the water outlet 20. In the pressurized mode, the fluid pressure on the side of the diaphragm 80 facing the flow path is greater than the pressure in the ambient portion of the diaphragm chamber 44 on the opposite side of the diaphragm 80. This pressure differential causes the diaphragm 80 to move toward the bottom wall 46 of the diaphragm chamber 44, thereby pulling the arcuate segment closer to the hump 50 and the water inlet 26. During normal operation, for example, the size of the gap can be about 0.003 inches. If the water inlet 26 is partially blocked, or there is an upstream partial blockage, then the fluid pressure on the side of the diaphragm 80 facing the flow path can decrease, thereby causing less pulling of the arcuate span 32 toward the hump 50 and water inlet 26. Less pulling or tensioning of the arcuate span 32 means that the size of the gap can increase, thereby facilitating a return to or toward the original pressure before the partial blockage. The blockage can be due to large grit, for example. If the blockage increases to a sufficient extent, the size of the gap can increase an amount sufficient to allow the grit to pass through the water inlet 26, into the tortuous path 76, and through the water outlet 20. Such blockage can increase, for example, if more grit accumulates. Another way that the grit can pass is if there is a surge or pressure spike at the water inlet 26, such as may occur upon ceasing to supply pressurized water to the irrigation tubing to which the drip emitter 10 is connected.

As shown in FIG. 19, a plurality of the drip emitters of the type described herein can be attached in fluid communication emitter tubing as part of an irrigation system. The emitter tubing can be in turn attached to a control zone valve, as well as a filter and/or pressure regulator. The control zone valves can be supplied via supply pipe with water from a pressure source. The control zone valves can be electronically controlled using an irrigation controller.

While the foregoing description is with respect to specific examples, those skilled in the art will appreciate that there are numerous variations of the above that fall within the scope of the concepts described herein and the appended claims.

The invention claimed is:

1. A drip emitter comprising a housing containing a flow path extending between a water inlet and a water outlet, a pressure-reducing segment of the flow path downstream of the inlet and upstream of the outlet, and a dynamic pressure regulator downstream of the water inlet and upstream of the pressure-reducing segment of the flow path, the dynamic pressure regulator being configured such that a decrease in pressure in the pressure-reducing segment of the flow path causes the dynamic pressure regulator to adjust to maintain a generally constant rate of flow through the water inlet as compared to the rate of flow when there is no decrease in pressure in the pressure-reducing segment of the flow path, and the dynamic pressure regulator being configured to substantially or completely block the flow path upstream of the pressure-reducing segment of the flow path and, as part of a check valve, both downstream and spaced from the water inlet.

2. A drip emitter comprising a housing containing a flow path extending between a water inlet and a water outlet, a pressure-reducing segment of the flow path downstream of the inlet and upstream of the outlet, and a dynamic pressure regulator downstream of the water inlet and upstream of the pressure-reducing segment of the flow path, the dynamic pressure regulator being configured such that a decrease in pressure in the pressure-reducing segment of the flow path causes the dynamic pressure regulator to adjust to maintain a generally constant rate of flow through the water inlet as compared to the rate of flow when there is no decrease in pressure in the pressure-reducing segment of the flow path, wherein the dynamic pressure regulator comprises a first portion and a second portion, the first portion being moveable toward the water inlet in response to increased pressure acting on the second portion when there is a higher pressure in the pressure-reducing segment of the flow path and moveable away from the water inlet in response to relatively decreased pressure acting on the second portion when there is a lower pressure in the pressure-reducing segment of the flow path.

3. The drip emitter of claim 2, wherein the second portion of the dynamic pressure regulator comprises a diaphragm having one side facing the flow path and an opposite side exposed to the environment external to the housing.

4. The drip emitter of claim 3, further comprising a check valve for substantially or completely blocking the flow path upstream of the pressure-reducing segment of the flow path and downstream of the water inlet in response to the pressure on the one side of the diaphragm facing the flow path being less than the pressure on the opposite side of the diaphragm that is exposed to the environment external to the housing.

5. The drip emitter of claim 4, wherein the check valve is formed between the diaphragm and a portion of the housing, the diaphragm being moveable toward the portion of the housing when the pressure on the one side of the diaphragm facing the flow path is less than the pressure on the opposite side of the diaphragm that is exposed to the environment external to the housing and moveable away from the portion of the housing when the pressure on the one side of the diaphragm facing the flow path is greater than the pressure on the opposite side of the diaphragm that is exposed to the environment external to the housing.

6. The drip emitter of claim 5, wherein the pressure-reducing segment of the flow path is a tortuous path.

7. The drip emitter of claim 6, wherein the housing comprises a lower portion and an upper portion, and the tortuous path is defined between the lower portion and the upper portion.

8. The drip emitter of claim 7, wherein the lower portion includes the water inlet and the upper portion includes the water outlet.

9. The drip emitter of claim 8, wherein there is a pressure regulation zone defined as a gap between the water inlet and the first portion of the dynamic pressure regulator, the dynamic pressure regulator being configured such that a decrease in pressure in the pressure-reducing segment of the flow path causes the dynamic pressure regulator to adjust to maintain a generally constant rate of flow through the water inlet by increasing the size of the gap of the pressure regulation zone as compared to the size of the gap when there is no decrease in pressure in the pressure-reducing segment of the flow path.

10. The drip emitter of claim 9, wherein the lower portion of the housing has a diaphragm chamber in which the diaphragm is seated, the diaphragm dividing the diaphragm chamber into a portion facing the flow path and a portion facing at least one port in communication with the environment external to the housing.

11. The drip emitter of claim 10, wherein the dynamic pressure regulator is a flexible member.

12. The drip emitter of claim 11, wherein the lower portion of the housing has a barbed member with a flow path therethrough and in fluid communication with and upstream of the water inlet.

13. The drip emitter of claim 12, wherein an entrance to the tortuous path is in the upper portion of the housing and an exit from the tortuous path is in the upper portion of the housing.

14. The drip emitter of claim 13, wherein the water outlet comprises a flow path through a barbed member of the upper portion of the housing.

15. The drip emitter of claim 14, in combination with a length of drip irrigation tubing, the barbed member of the lower portion of the housing extends into an interior of the length of drip irrigation tubing so that a flow path from the interior of the length of drip irrigation tubing into the drip emitter is provided, and the barbed member of the upper portion of the housing is disposed outside of the interior of the drip irrigation tubing.

16. An irrigation system comprising:
a water source;
a control zone valve; and
a length of drip irrigation tubing downstream of the valve, the drip irrigation tubing in fluid communication with a plurality of drip emitters in accordance with claim 2 for discharging fluid from the water source through the drip emitters when the control zone valve is open.

17. A drip emitter comprising a housing containing a flow path extending between a water inlet and a water outlet, a pressure-reducing segment of the flow path downstream of the inlet and upstream of the outlet, and a dynamic pressure regulator downstream of the water inlet and upstream of the pressure-reducing segment of the flow path, the dynamic pressure regulator being configured such that a decrease in pressure in the pressure-reducing segment of the flow path causes the dynamic pressure regulator to adjust to maintain a generally constant rate of flow through the water inlet as compared to the rate of flow when there is no decrease in pressure in the pressure-reducing segment of the flow path, wherein there is a pressure regulation zone defined as a gap between the water inlet and an adjacent portion of the dynamic pressure regulator, the dynamic pressure regulator being configured such that a decrease in pressure in the pressure-reducing segment of the flow path causes the dynamic pressure regulator to adjust to maintain a generally constant rate of flow through the water inlet by increasing the size of the gap of the pressure regulation zone as compared to the size of the gap when there is no decrease in pressure in the pressure-reducing segment of the flow path.

18. The drip emitter of claim 17, wherein the dynamic pressure regulator includes a diaphragm portion, the diaphragm portion being configured to move the portion of the dynamic pressure regulator adjacent the inlet toward the inlet to decrease the gap therebetween.

19. The drip emitter of claim 18, wherein the diaphragm portion has a side facing the flow path and another side exposed to ambient pressure external to the housing.

20. The drip emitter of claim 1, wherein a portion of the dynamic pressure regulator is exposed to ambient pressure external to the housing.

* * * * *